(12) United States Patent
Formato et al.

(10) Patent No.: US 6,805,966 B1
(45) Date of Patent: Oct. 19, 2004

(54) METHOD OF MANUFACTURING A DUAL-SIDED STAMPER/IMPRINTER, METHOD OF SIMULTANEOUSLY FORMING MAGNETIC TRANSITION PATTERNS AND DUAL-SIDED STAMPER/IMPRINTER

(75) Inventors: Christopher Formato, Brentwood, CA (US); Jing Gui, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 67 days.

(21) Appl. No.: 10/361,578

(22) Filed: Feb. 11, 2003

Related U.S. Application Data
(60) Provisional application No. 60/392,901, filed on Jun. 28, 2002.

(51) Int. Cl.[7] .............................................. B32B 15/04
(52) U.S. Cl. ..................... 428/457; 101/34; 204/471; 427/123; 427/127; 427/128; 427/129; 427/130; 427/131; 427/132; 427/133; 427/250; 427/259; 427/261; 427/265; 427/270; 427/272; 427/275; 427/282; 427/299; 427/307; 427/383.1; 427/404; 427/443.1; 427/585; 428/692; 428/900

(58) Field of Search .................. 427/123, 127–132, 427/133, 250, 259, 261, 265, 270, 272, 275, 282, 299, 307, 383.1, 404, 443.1, 585; 428/457, 692, 800; 204/471; 101/34

(56) References Cited

U.S. PATENT DOCUMENTS 6,761,618 B1 * 7/2004 Leigh et al. .................. 451/11

* cited by examiner

Primary Examiner—Bernard Pianalto
(74) Attorney, Agent, or Firm—McDermott Will & Emery LLP

(57) ABSTRACT

A dual-sided stamper/imprinter for simultaneously forming magnetic transition patterns in spaced-apart first and second layers of magnetic material by contact printing comprises a mechanically hard, substantially rigid magnetic material having high saturation magnetization and high permeability and including first and second oppositely facing imprinting surfaces, wherein each of the imprinting surfaced has a topographical pattern formed therein comprising a patterned plurality of spaced-apart recesses with a plurality of non-recessed areas therebetween, each topographical pattern corresponding to a magnetic transition pattern to be formed in a respective layer of magnetic material. Also disclosed is a method for manufacturing dual-sided stampers/imprinters.

20 Claims, 6 Drawing Sheets

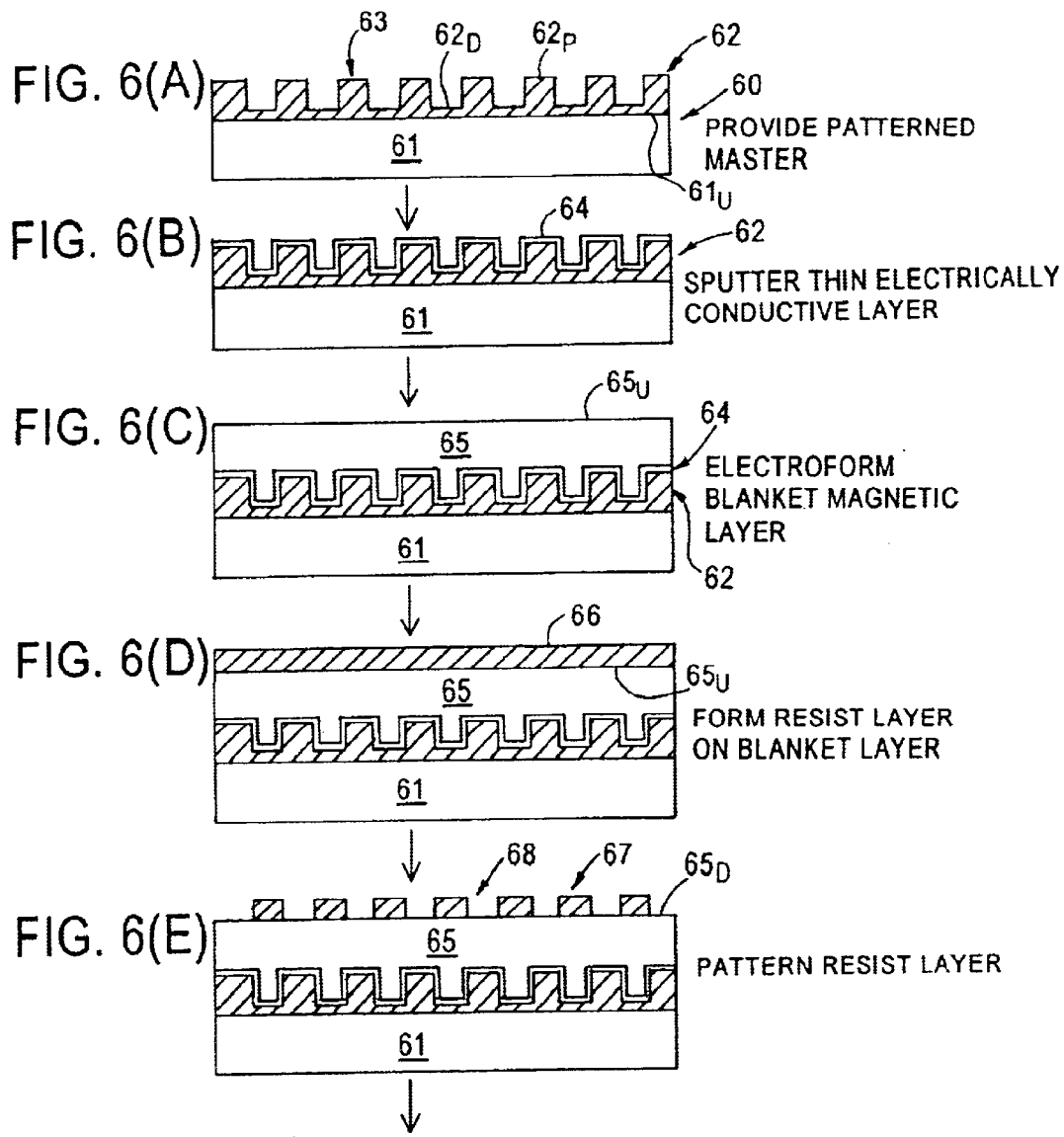

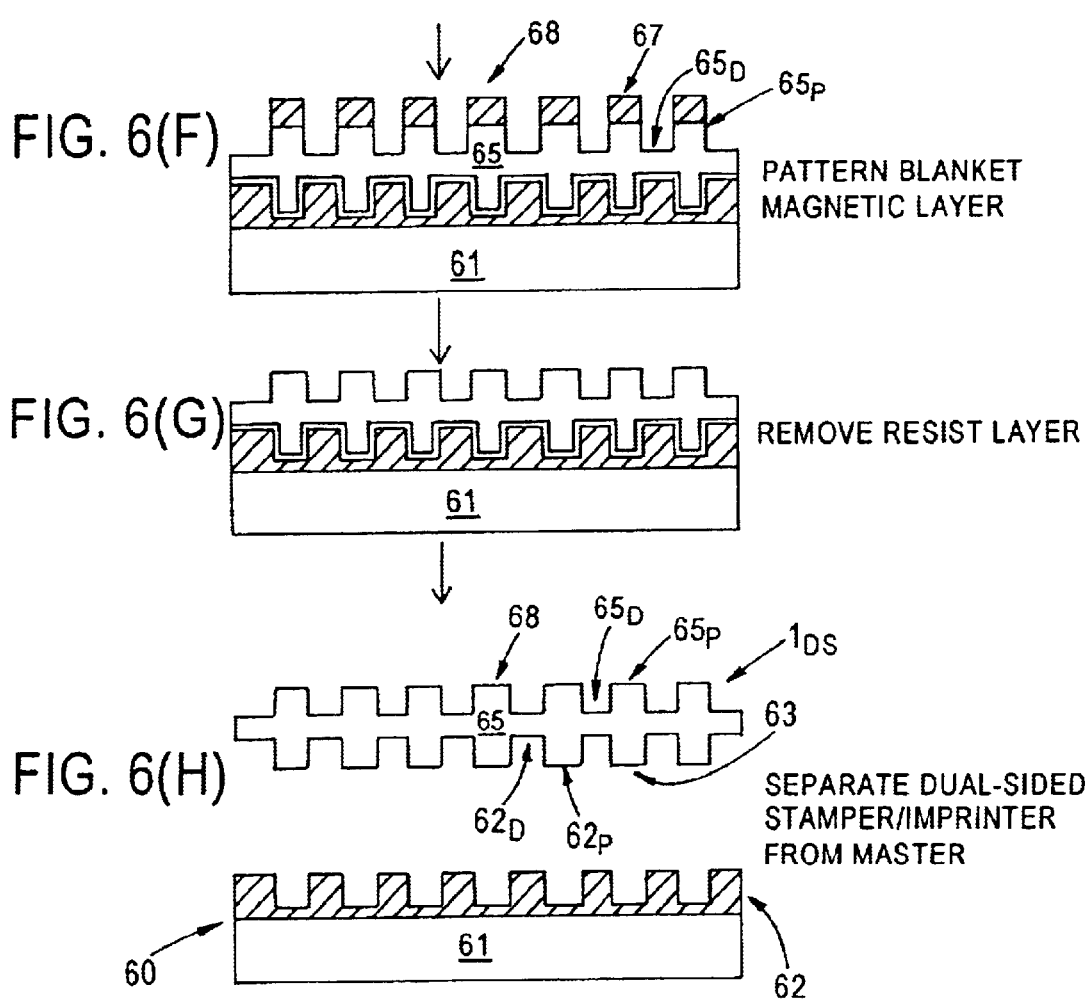

METHOD OF MANUFACTURING A DUAL-SIDED STAMPER/IMPRINTER, METHOD OF SIMULTANEOUSLY FORMING MAGNETIC TRANSITION PATTERNS AND DUAL-SIDED STAMPER/IMPRINTER

CROSS-REFERENCE TO PROVISIONAL APPLICATION

This application claims priority from U.S. provisional patent application Serial No. 60/392,901 filed Jun. 28, 2002, the entire disclosure of which is incorporated herein by reference.

FIELD OF THE INVENTION

The present invention relates to methods and devices for forming magnetic transition patterns in a layer or body of magnetic material. The invention has particular utility in the formation of servo patterns in the surfaces of magnetic recording layers of magnetic data/information storage and retrieval media, e.g., hard disks.

BACKGROUND OF THE INVENTION

Magnetic recording media are widely used in various applications, e.g., in hard disk form, particularly in the computer industry for storage and retrieval of large amounts of data/information in magnetizable form. Such media are conventionally fabricated in thin film form and are generally classified as "longitudinal" or "perpendicular", depending upon the orientation (i.e., parallel or perpendicular) of the magnetic domains of the grains of the magnetic material constituting the active magnetic recording layer, relative to the surface of the layer.

A portion of a conventional thin-film, longitudinal-type recording medium 1 utilized in disk form in computer-related applications is schematically depicted in FIG. 1 and comprises a non-magnetic substrate 10, typically of metal, e.g., an aluminum-magnesium (Al—Mg) alloy, having sequentially deposited thereon a plating layer 11, such as of amorphous nickel-phosphorus (NiP), a polycrystalline underlayer 12, typically of chromium (Cr) or a Cr-based alloy, a magnetic layer 13, e.g., of a cobalt (Co)-based alloy, a protective overcoat layer 14, typically containing carbon (C), e.g., diamond-like carbon ("DLC"), and a lubricant topcoat layer 15, typically of a perfluoropolyether compound applied by dipping, spraying, etc.

In operation of medium 1, the magnetic layer 13 is locally magnetized by a write transducer or write head (not shown in FIG. 1 for simplicity) to record and store data/information. The write transducer creates a highly concentrated magnetic field which alternates direction based on the bits of information being stored. When the local magnetic field applied by the write transducer is greater than the coercivity of the recording medium layer 13, then the grains of the polycrystalline medium at that location are magnetized. The grains retain their magnetization after the magnetic field applied by the write transducer is removed. The direction of the magnetization matches the direction of the applied magnetic field. The pattern of magnetization of the recording medium can subsequently produce an electrical response in a read transducer, allowing the stored medium to be read.

A typical recording system 20 utilizing a thin-film, vertically oriented, perpendicular-type magnetic medium 1' is illustrated in FIG. 2, wherein reference numerals 10, 11, 12A, 12B and 13', respectively, indicate the substrate, plating layer, soft magnetic underlayer, at least one non-magnetic interlayer, and vertically oriented, hard magnetic recording layer of perpendicular-type magnetic medium 1, and reference numerals 7 and 8, respectively, indicate the single and auxiliary poles of single-pole magnetic transducer head 6. Relatively thin interlayer 12B (also referred to as an "intermediate" layer), comprised of one or more layers of non-magnetic materials, serves to (1) prevent magnetic interaction between the soft underlayer 12A and the hard recording layer 13' and (2) promote desired microstructural and magnetic properties of the hard recording layer. As shown by the arrows in the figure indicating the path of the magnetic flux $\phi$, flux $\phi$ is seen as emanating from single pole 7 of single-pole magnetic transducer head 6, entering and passing through vertically oriented, hard magnetic recording layer 13' (which, as is known, may comprise a Co-based alloy, an iron oxide, or a multilayer magnetic superlattice structure) in the region above single pole 7, entering and travelling along soft magnetic underlayer 12A for a distance, and then exiting therefrom and passing through vertically oriented, hard magnetic recording layer 13' in the region above auxiliary pole 8 of single-pole magnetic transducer head 6. The direction of movement of perpendicular magnetic medium 1 past transducer head 6 is indicated in the figure by the arrow above medium 1.

With continued reference to FIG. 2, vertical lines 9 indicate grain boundaries of each polycrystalline (i.e., granular) layer of the layer stack constituting medium 1. As apparent from the figure, the width of the grains (as measured in a horizontal direction) of each of the polycrystalline layers constituting the layer stack of the medium is substantially the same, i.e., each overlying layer replicates the grain width of the underlying layer. Not shown in the figure, for illustrative simplicity, are a protective overcoat layer 14, such as of a diamond-like carbon (DLC) formed over hard magnetic layer 13', and a lubricant topcoat layer 15, such as of a perfluoropolyethylene material, formed over the protective overcoat layer. As with the longitudinal-type recording medium 1 shown in FIG. 1, substrate 10 is typically disk-shaped and comprised of a non-magnetic metal or alloy, e.g., Al or an Al-based alloy, such as Al—Mg having an Ni—P plating layer 11 on the deposition surface thereof, or substrate 10 is comprised of a suitable glass, ceramic, glass-ceramic, polymeric material, or a composite or laminate of these materials; soft underlayer 12A is typically comprised of an about 500 to about 4,000 Å thick layer of a soft magnetic material selected from the group consisting of Ni, NiFe (Permalloy), Co, CoZr, CoZrCr, CoZrNb, CoFe, Fe, FeN, FeSiAl, FeSiAlN, etc.; thin interlayer 12B typically comprises an up to about 100 Å thick layer of a non-magnetic material, such as TiCr; and hard magnetic layer 13' is typically comprised of an about 100 to about 250 Å thick layer of a Co-based alloy including one or more elements selected from the group consisting of Cr, Fe, Ta, Ni, Mo, Pt, V, Nb, Ge, and B, iron oxides, such as $Fe_3O_4$ and $\delta$-$Fe_2O_3$, or a $(CoX/Pd$ or $Pt)_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, and Pt, and each of the alternating thin, non-magnetic layers of Pd or Pt is about 1 Å thick. Each type of hard magnetic recording layer material has perpendicular anisotropy arising from magneto-crystalline anisotropy ($1^{st}$ type) and/or interfacial anisotropy ($2^{nd}$ type).

A typical contact start/stop (CSS) method employed during use of disk-shaped media involves a floating transducer head gliding at a predetermined distance from the surface of the disk due to dynamic pressure effects caused by air flow generated between mutually sliding surfaces of the transducer head and the disk. During reading and recording (writing) operations, the transducer head is maintained at a controlled distance from the recording surface, supported on a bearing of air as the disk rotates, such that the transducer head is freely movable in both the circumferential and radial directions, thereby allowing data to be recorded and retrieved from the disk at a desired position in a data zone.

Adverting to FIG. 3, shown therein, in simplified, schematic plan view, is a magnetic recording disk 30 (of either longitudinal or perpendicular type) having a data zone 34 including a plurality of servo tracks, and a contact start/stop (CSS) zone 32. A servo pattern 40 is formed within the data zone 34, and includes a number of data track zones 38 separated by servo tracking zones 36. The data storage function of disk 30 is confined to the data track zones 38, while servo tracking zones 36 provide information to the disk drive which allows a read/write head to maintain alignment on the individual, tightly-spaced data tracks.

Although only a relatively few of the servo tracking zones are shown in FIG. 3 for illustrative simplicity, it should be recognized that the track patterns of the media contemplated herein may include several hundreds of servo zones to improve head tracking during each rotation of the disk. In addition, the servo tracking zones need not be straight radial zones as shown in the figure, but may instead comprise arcs, intermittent zones, or irregularly-shaped zones separating individual data tracks.

In conventional hard disk drives, data is stored in terms of bits along the data tracks. In operation, the disk is rotated at a relatively high speed, and the magnetic head assembly is mounted on the end of a support or actuator arm, which radially positions the head on the disk surface. If the actuator arm is held stationary, the magnetic head assembly will pass over a circular path on the disk, i.e., over a data track, and information can be read from or written to that track. Each concentric track has a unique radius, and reading and writing information from or to a specific track requires the magnetic head to be located above that track. By moving the actuator arm, the magnetic head assembly is moved radially on the disk surface between tracks. Many actuator arms are rotatable, wherein the magnetic head assembly is moved between tracks by activating a servomotor which pivots the actuator arm about an axis of rotation. Alternatively, a linear actuator may be used to move a magnetic head assembly radially inwardly or outwardly along a straight line.

As has been stated above, to record information on the disk, the transducer creates and applies a highly concentrated magnetic field in close proximity to the magnetic recording medium. During writing, the strength of the concentrated magnetic field directly under the write transducer is greater than the coercivity of the recording medium, and grains of the recording medium at that location are magnetized in a direction which matches the direction of the applied magnetic field. The grains of the recording medium retain their magnetization after the magnetic field is removed. As the disk rotates, the direction of the writing magnetic field is alternated, based on bits of the information being stored, thereby recording a magnetic pattern on the track directly under the write transducer.

On each track, eight "bits" typically form one "byte" and bytes of data are grouped as sectors. Reading or writing a sector requires knowledge of the physical location of the data in the data zone so that the servo-controller of the disk drive can accurately position the read/write head in the correct location at the correct time. Most disk drives use disks with embedded "servo patterns" of magnetically readable information. The servo patterns are read by the magnetic head assembly to inform the disk drive of track location. In conventional disk drives, tracks typically include both data sectors and servo patterns and each servo pattern typically includes radial indexing information, as well as a "servo burst". A servo burst is a centering pattern to precisely position the head over the center of the track. Because of the locational precision needed, writing of servo patterns requires expensive servo-pattern writing equipment and is a time consuming process.

An approach for overcoming, or at least alleviating, the above problems associated with writing of magnetic patterns in a magnetic layer, e.g., servo patterns, is disclosed in commonly assigned U.S. Pat. No. 5,991,104 to Bonyhard.

According to this approach, a method for forming a magnetic transition pattern, such as a servo pattern, in a layer of a magnetic material comprises steps of:

1) aligning a magnetic disk immediately adjacent a master servo writer medium, the latter constituted of a magnetic layer having a greater magnetic coercivity than the former, wherein the servo-writer medium has a master servo pattern magnetically stored thereon which defines a plurality of concentric tracks;

2) applying a magnetic assist field to the aligned master servo-writer medium and magnetic disk, the magnetic assist field having a substantially equal magnitude at all tracks on the aligned master servo-writer medium and magnetic disk; and 3) rotating the aligned master servo-writer medium and magnetic disk relative to the magnetic assist field.

However, the above-described method incurs several drawbacks associated with its implementation in an industrially viable manner. Specifically, a "one-of-a-kind" master writer with a very high write field gradient is necessary for writing the requisite high intensity, master magnetic servo pattern onto the master disk, and a complicated means for rotating the aligned master servo-writer disk and "slave" workpiece magnetic disk is required, as is a complex system for controlling/regulating/rotating the intensity (i.e., magnitude) and directions of the magnetic assist field.

Commonly assigned, co-pending U.S. patent application Ser. No. 10/082,178, filed Feb. 26, 2002, the entire disclosure of which is incorporated herein by reference, discloses an improvement over the invention disclosed in the aforementioned commonly assigned U.S. Pat. No. 5,991,104, and is based upon the discovery that very sharply defined magnetic transition patterns can be reliably, rapidly, and cost-effectively formed in a magnetic medium containing a longitudinal or perpendicular type magnetic recording layer without requiring expensive, complicated fabrication of a master disk.

Specifically, the invention disclosed in U.S. patent application Ser. No. 10/082,178 is based upon recognition that a stamper/imprinter (analogous to the aforementioned "master") comprised of a magnetic material having a high saturation magnetization, $B_{sat}$, i.e., $B_{sat} \geq$ about 0.5 Tesla, and a high permeability, $\mu$, i.e., $\mu \geq$ about 5, e.g., selected from Ni, NiFe, CoNiFe, CoSiFe, CoFe, and CoFeV, can be effectively utilized as a "master" contact mask (or "stamper/imprinter") for contact "imprinting" of a magnetic transition pattern, e.g., a servo pattern, in the surface of a magnetic recording layer of a magnetic medium ("slave"), whether of longitudinal or perpendicular type. A key feature of this invention is the use of a stamper/imprinter having an imprinting surface including a topographical pattern, i.e., comprised of projections and depressions, corresponding to a desired magnetic transition pattern, e.g., a servo pattern, to be formed in the magnetic recording layer. An advantage afforded by the invention is the ability to fabricate the topographically patterned imprinting surface of the stamper/imprinter, as well as the substrate or body therefor, of a single material, as by use of well-known and economical electro-forming techniques.

According to this invention, the magnetic domains of the magnetic recording layer of the slave medium are first unidirectionally aligned (i.e., "erased" or "initialized"), as by application of a first external, unidirectional magnetic field $H_{initial}$ of first direction and high strength greater than the saturation field of the magnetic recording layer, typically $\geq 2,000$ and up to about 20,000 Oe. The imprinting surface of the stamper/imprinter (master) is then brought into intimate (i.e., touching) contact with the surface of the magnetic recording layer (slave). With the assistance of a second externally applied magnetic field of second, opposite direction and lower but appropriate strength $H_{re-align}$, determined by $B_{sat}/\mu$ of the stamper material (typically $\geq 100$ Oe, e.g., from about 2,000 to about 4,500 Oe), the alignment of the magnetic domains at the areas of contact between the projections of the imprinting surface of the stamper/imprinter or at the areas facing the depressions of the imprinting surface of the stamper/imprinter and the magnetic recording layer of the medium to be patterned (slave) is selectively reversed, while the alignment of the magnetic domains at the non-contacting areas (defined by the depressions in the imprinting surface of the stamper/imprinter) or at the contacting areas, respectively, is unaffected, whereby a sharply defined magnetic transition pattern is created within the magnetic recording layer of the medium to be patterned (slave) which essentially mimics the topographical pattern of projections and depressions of the imprinting surface (master). According to the invention, high $B_{sat}$ and high $\mu$ materials are preferred for use as the stamper/imprinter in order to: (1) avoid early magnetic saturation of the stamper/imprinter at the contact points between the projections of the imprinting surface and the magnetic recording layer, and (2) provide an easy path for the magnetic flux lines which enter and/or exit at the side edges of the projections.

Stampers/imprinters for use in a typical application according to the disclosed invention, e.g., servo pattern formation in the recording layer of a disk-shaped, thin film, longitudinal or perpendicular magnetic recording medium, are formed according to conventional techniques, and typically comprise an imprinting surface having topographical features consisting of larger area data zones separated by smaller areas with well-defined patterns of projections and depressions corresponding to conventionally configured servo sectors, as for example, disclosed in the aforementioned U.S. Pat. No. 5,991,104, the entire disclosure of which is incorporated herein by reference. For example, a suitable topography for forming the servo sectors may comprise a plurality of projections having a height in the range from about 20 to about 500 nm, a width in the range from about 0.01 to about 1 $\mu$m, and a spacing of at least about 0.01 $\mu$m. Stampers/imprinters comprising imprinting surfaces with suitable surface topographies may be readily formed by a variety of techniques, such as electroforming onto a planar-surfaced substrate through an apertured, non-conductive mask, or by pattern formation in a planar-surfaced substrate by means photolithographic wet (i.e., chemical) or dry (e.g., plasma, sputter, or ion beam) etching techniques.

FIG. 4 illustrates a sequence of steps for performing magnetic transition patterning by contact printing of a perpendicular recording medium, e.g., medium 1' depicted in FIG. 2 and comprised of a non-magnetic substrate 10 and an overlying thin layer 13' of a perpendicular-type magnetic recording material (where plating layer 11, soft magnetic underlayer 12A, and non-magnetic interlayer 12B are omitted from FIG. 4 in order to not unnecessarily obscure the essential features/aspects of the present invention) is subjected to a DC erase or magnetic initialization process for unidirectionally aligning the perpendicularly oriented magnetic domains $13_1$ of magnetic recording layer 13'. Magnetic initialization of perpendicular medium 1' is accomplished by applying a first, high strength, unidirectional DC magnetic initialization field $H_{initial}$ normal to the opposed major surfaces thereof, i.e., normal to the lower surface of substrate 10 and upper surface of magnetic recording layer 13', wherein $H_{initial} \geq$ coercivity of layer 13' and is typically in the range from above about 2,000 to about 20,000 Oe.

According to the next step of the process sequence, a stamper/imprinter 16 composed of composed of a body of magnetic material having a high saturation magnetization, $B_{sat}$, i.e., $B_{sat} \geq$ about 0.5 Tesla, and a high permeability, $\mu$, i.e., $\mu \geq$ about 5, e.g., selected from Ni, NiFe, CoNiFe, CoSiFe, CoFe, and CoFeV, and having an imprinting surface 17 having a topography comprised of a plurality of projections 18 and depressions 19 arranged in a pattern corresponding to a magnetic transition pattern to be formed in the surface of magnetic recording layer 13', e.g., a plurality of data zones separated by servo sectors, is placed in intimate (i.e., touching) contact with the surface of layer 13'. By way of illustration only, a suitable topography for the imprinting surface 17 of a contact mask-type stamper/imprinter 16 for use in forming a recording medium with data zones separated by servo sectors according to the invention may comprise a plurality of projections 18 having a height in the range from about 20 to about 500 nm, a width in the range from about 0.01 to about 1 $\mu$m, and a spacing (defining the depressions 19) of at least about 0.01 $\mu$m). A second, unidirectional DC magnetic re-alignment field $H_{re-align}$ of direction reverse that of the DC magnetic initialization field $H_{initial}$ is then applied normal to the upper surface of stamper/imprinter 16 and the lower surface of substrate 10 of medium 1', the strength of $H_{re-align}$ being lower than that of $H_{initial}$ and optimized at a value determined by $B_{sat}/\mu$ of the stamper material (typically $\geq 100$ Oe, e.g., from about 2,000 to about 4,500 Oe for the above-listed high $B_{sat}$, high $\mu$ materials). According to the invention, due to the high permeability $\mu$ of the stamper material, the magnetic flux $\phi$ provided by the re-alignment field $H_{re-align}$ tends to concentrate at the projections 18 of the stamper/imprinter 16, which projections are in touching contact with the surface of magnetic recording layer 13'. As a consequence, the surface areas of magnetic recording layer 13' immediately beneath the projections 18 experience a significantly higher magnetic field than the surface areas at the non-contacting areas facing the depressions 19. If the re-alignment field strength $H_{re-align}$ is optimized (e.g., as described supra), the direction of magnetization (i.e., alignment) of the perpendicularly oriented magnetic domains $13_{195}$ is selectively reversed (as indicated by the arrows in the figure) at the areas of the magnetic recording layer 13' where the projections 18 of the imprinting surface 17 of the stamper/imprinter 16 contact the surface of the magnetic recording layer 13', and the magnetic alignment of the perpendicularly oriented magnetic domains $13_{195}$ facing the depressions 19 in the imprinting surface 17 is retained. Consequently, upon removal of the stamper/imprinter 16 and the re-alignment field $H_{re-align}$ in the next (i.e., final) step according to the inventive methodology, a perpendicular recording medium 1' is formed with a magnetic transition pattern comprising a plurality of data zones separated by servo sectors each comprising a plurality of reversely oriented perpendicular magnetic domains $13_{LR}$ corresponding to the desired servo pattern.

FIG. 5 illustrates a similar sequence of steps for performing magnetic transition patterning by contact printing of a longitudinal recording medium, e.g., medium 1 depicted in FIG. 1 and comprised of a non-magnetic substrate 10 and an overlying thin layer 13 of a longitudinal-type magnetic layer (where plating layer 11, polycrystalline underlayer 12, protective overcoat layer 14, and lubricant topcoat layer 15 are omitted from FIG. 5 in order not to unnecessarily obscure the essential features/aspects of the present invention) is initially subjected to a magnetic erase (or "initialization") process for unidirectionally aligning the longitudinally oriented magnetic domains $13_{-}$ of magnetic recording layer 13. Magnetic initialization of longitudinal medium 1 is accomplished by applying a first, high strength, unidirectional magnetic field $H_{initial}$ parallel to the surface of the magnetic recording layer, such that $H_{initial} \geq$ coercivity of layer 13' and is typically in the range from about 2,000 to about 20,000 Oe. In this instance, $H_{initial}$ is applied perpendicularly (i.e., normal) to the side edges of medium 1, whereas, by contrast, $H_{initial}$ for a perpendicular medium would be applied normal to the upper and lower major surfaces of the medium.

According to the next step of the process sequence, a stamper/imprinter 16 comprised of a body of magnetic material having a high saturation magnetization, $B_{sat}$, i.e., $B_{sat} \geq$ about 0.5 Tesla, and a high permeability, $\mu$, i.e., $\mu \geq$ about 5, e.g., selected from Ni, NiFe, CoNiFe, CoSiFe, CoFe, and CoFeV, and having an imprinting surface 17 having a topography comprised of a plurality of projections 18 and depressions 19 arranged in a pattern corresponding to a magnetic transition pattern to be formed in the surface of magnetic recording layer 13, e.g., a plurality of data zones separated by servo sectors, is placed in intimate (i.e., touching) contact with the surface of layer 13. By way of illustration only, a suitable topography for the imprinting surface 17 of a contact mask-type stamper/imprinter 16 for use in forming a recording medium with data zones separated by servo sectors in longitudinal recording layer 13 according to the invention may comprise a plurality of projections 18 having a height in the range from about 20 to about 500 nm, a width of at least about 0.01 $\mu$m, and a spacing (defining the depressions 19) in the range from about 0.01 to about 1 $\mu$m. A second, unidirectional magnetic re-alignment field $H_{re-align}$ parallel to the major surface of magnetic recording layer 13 but of lower strength and direction reverse that of the magnetic initialization field $H_{initial}$ is then applied normal to the side edge surfaces of stamper/imprinter 16, the strength of $H_{re-align}$ being optimized at a value determined by $B_{sat}/\mu$ of the stamper material (typically $\geq$ 100 Oe, e.g., from about 2,000 to about 4,500 Oe for the above-listed high $B_{sat}$, high $\mu$ materials).

According to the invention, due to the high permeability $\mu$ of the stamper material, the magnetic flux $\phi$ provided by the re-alignment field $H_{re-align}$ enters and exits the side edges of the projections and tends to concentrate at the depressions 19 of the stamper/imprinter 16 (rather than at the projections 18). As a consequence, the non-contacted surface areas of magnetic recording layer 13 immediately beneath the depressions 19 experience a significantly higher magnetic field than the surface areas of the magnetic recording layer 13 in contact with the projections 18. If the re-alignment field strength $H_{re-align}$ is optimized, the direction of magnetization (i.e., alignment) of the longitudinally oriented magnetic domains $13_{-}$ of the magnetic recording layer 13 will be selectively reversed (as indicated by the arrows in the figure) at the areas facing the depressions 19 of the imprinting surface 17 of the stamper/imprinter 16, whereas the alignment of the longitudinally oriented magnetic domains $13_{-}$ of the magnetic recording layer 13 in contact with the projections 18 of the imprinting surface 17 of the stamper/imprinter 16 will be retained. Consequently, upon removal of the stamper/imprinter 16 and the re-alignment field $H_{re-align}$ in the next (i.e., final) step according to the inventive methodology, a longitudinal recording medium 1 is formed with a magnetic transition pattern comprising a plurality of data zones separated by servo sectors each comprising of a plurality of reversely longitudinally oriented magnetic domains $13_{-R}$ corresponding to the desired servo pattern.

Currently, contact printing for servo patterning of magnetic media is performed on one surface of one disk at-a-time, which practice disadvantageously imposes severe limitations on product throughput rates. Another disadvantage associated with the one surface at-a-time approach is the difficulty in performing contact printing of magnetic media such that the magnetic transition pattern on one media surface is a mirror image of the magnetic transition pattern on another surface. Formation of mirror image magnetic transition patterns on different media surfaces is considered desirable in order to minimize "WIRRO" (Written In Repeatable Run Out) problems in multi-disk hard drive devices.

A further problem associated with the need for dual-side contact printing means for obtaining increased product throughput rates necessary for economic competitiveness of servo-patterned disk manufacture is that conventional techniques for forming stampers/imprinters with topographically patterned imprinting surfaces, e.g., electroforming techniques, are limited to formation of single-sided stampers/imprinters.

Accordingly, there exists a need for means and methodology for performing dual-sided servo patterning by contact printing which are free of the above-described drawbacks and disadvantages associated with the use of conventional single-sided stampers/imprinters, and facilitate high quality, high throughput replication of servo patterns in single and dual-sided magnetic recording media via contact printing. Moreover, there exists a need for methodology and instrumentalities, e.g., improved stampers/imprinters for performing rapid, cost-effective servo patterning of dual-sided, thin film, high areal recording density magnetic recording media which do not engender the above-stated concerns and disadvantages associated with existing methodologies/instrumentalities for patterning magnetic recording media by contact printing.

The present invention addresses and solves the above-described problems, disadvantages, and drawbacks associated with prior methodologies for servo pattern formation in single and dual-sided thin film magnetic recording media, while maintaining full compatibility with the requirements of automated hard disk manufacturing technology.

DISCLOSURE OF THE INVENTION

An advantage of the present invention is an improved method of manufacturing a dual-sided stamper/imprinter for use in simultaneously forming magnetic transition patterns in spaced-apart first and second layers of magnetic material by means of contact printing.

Another advantage of the present invention is an improved method of manufacturing a dual-sided stamper/imprinter for use in simultaneously forming servo patterns in spaced-apart first and second layers of magnetic recording material by means of contact printing.

A further advantage of the present invention is an improved dual-sided stamper/imprinter for use in simultaneously forming magnetic transition patterns in spaced-apart first and second layers of magnetic material by means of contact printing.

A still further advantage of the present invention is an improved dual-sided stamper/imprinter for use in simultaneously forming servo patterns in spaced-apart first and second layers of magnetic recording material by means of contact printing.

Yet another advantage of the present invention is an improved method of simultaneously forming magnetic transition patterns in a plurality of spaced-apart layers of magnetic material by means of contact printing.

Still another advantage of the present invention is an improved method of simultaneously forming servo patterns in a plurality of spaced-apart layers of magnetic recording material by means of contact printing.

Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to one aspect of the present invention, the foregoing and other advantages are obtained in part by a method of manufacturing a dual-sided stamper/imprinter for use in simultaneously forming magnetic transition patterns in spaced-apart first and second layers of magnetic material by means of contact printing, comprising sequential steps of:

(a) providing a master having a surface with a first topographical pattern formed therein and comprising a patterned plurality of spaced-apart recesses with a plurality of non-recessed areas therebetween, the first topographical pattern corresponding to a first magnetic transition pattern to be formed in the first layer of magnetic material;

(b) forming a thin layer of an electrically conductive material on the surface with the first topographical pattern;

(c) forming a blanket layer of a magnetic material having high saturation magnetization $B_{sat} \geq$ about 0.5 Tesla, and high permeability $\mu \geq$ about 5, on the thin layer of electrically conductive material, the blanket layer overfilling each of the plurality of recesses and including an overburden portion extending over each of the non-recessed areas, the blanket layer having an exposed surface opposite the thin layer of electrically conductive material;

(d) forming a second topographical pattern in the exposed surface of the blanket layer, the second topographical pattern comprising a patterned plurality of spaced-apart recesses with a plurality of non-recessed areas therebetween and corresponding to a second magnetic transition pattern to be formed in the second layer of magnetic material; and (e) separating the blanket layer together with the underlying thin layer of electrically conductive material from the surface of the master with the first topographical pattern formed therein to provide a dual-sided stamper/imprinter having first and second oppositely facing topographically patterned imprinting surfaces.

According to embodiments of the present invention, step (a) comprises providing a master including a substrate and a layer of a resist material formed on a surface of the substrate, the first topographical pattern corresponding to the first magnetic transition pattern being formed in the layer of resist material; step (b) comprises forming the thin layer of an electrically conductive material on the surface with the first topographical pattern by means of a thin film deposition process selected from the group consisting of: electroless plating, physical vapor deposition (PVD), and chemical vapor deposition (CVD); step (c) comprises forming the blanket layer of a magnetic material selected from the group consisting of Ni, NiV, NiFe, CoNiFe, CoSiFe, CoFe, and CoFeV by means of an electrochemical process, e.g., electroforming; and step (d) comprises forming the second topographical pattern in the exposed surface of the blanket layer by means of a process comprising sequential steps of:

($d_1$) forming a layer of a resist material on the exposed surface of the blanket layer;

($d_2$) patterning the layer of resist material to expose portions of the surface of the blanket layer corresponding to the second magnetic transition pattern to be formed in the second layer of magnetic material;

($d_3$) forming recesses in the blanket layer at the exposed surface portions thereof, utilizing the patterned layer of resist material as an etch mask, the recesses forming a pattern corresponding to the second magnetic transition pattern to be formed in the surface of the blanket layer; and ($d_4$) removing the layer of resist material from the surface of the blanket layer.

Particular embodiments of the invention are those wherein:

step (a) comprises providing a master having a surface with a first topographical pattern corresponding to a servo pattern to be formed in the first magnetic layer (on a first substrate);

step (b) comprises sputtering a thin layer of a material selected from the group consisting of Ni, NiV, NiFe, CoNiFe, CoSiFe, CoFe, and CoFeV on the first topographical pattern;

step (c) comprises electroforming on the thin layer a blanket layer comprised of at least one magnetic material selected from the group consisting of Ni, NiV, NiFe, CoNiFe, CoSiFe, CoFe, and CoFeV; and step (d) comprises forming a second topographical pattern in the exposed surface of the blanket layer corresponding to a servo pattern to be formed in the second magnetic layer (on a second substrate).

Another aspect of the present invention is a dual-sided stamper/imprinter for use in simultaneously forming magnetic transition patterns in spaced-apart first and second layers of magnetic material by means of contact printing, comprising a magnetic material having high saturation magnetization $B_{sat} \geq$ about 0.5 Tesla, and high permeability $\mu \geq$ about 5, and including first and second oppositely facing imprinting surfaces, wherein:

the first imprinting surface has a first topographical pattern formed therein comprising a patterned plurality of spaced-apart recesses with a plurality of non-recessed areas therebetween, the first topographical pattern corresponding to a first magnetic transition pattern to be formed in the first layer of magnetic material; and the second imprinting surface has a second topographical pattern formed therein comprising a patterned plurality of spaced-apart recesses with a plurality of non-recessed areas therebetween, the second topographical pattern corresponding to a second magnetic transition pattern to be formed in the second layer of magnetic material.

According to certain embodiments of the present invention, the first and second topographical patterns are identical and may be aligned in mirror-image relation; whereas according to other embodiments of the invention, the first and second topographical patterns are different.

Preferred embodiments of the present invention are those wherein each of the first and second topographical patterns are servo patterns for disk-shaped recording media.

According to embodiments of the present invention, at least the first and second imprinting surfaces of the stamper/imprinter are comprised of at least one magnetic material selected from the group consisting of Ni, NiV, NiFe, CoNiFe, CoSiFe, CoFe, and CoFeV.

Yet another aspect of the present invention is an improved method of simultaneously forming magnetic transition patterns in a plurality of spaced-apart layers of magnetic material by means of contact printing, comprising steps of:

(a) providing a dual-sided stamper/imprinter having a first topographically patterned imprinting surface comprising a plurality of projections and depressions arranged in a pattern corresponding to a first magnetic transition pattern to be formed in a first one of the plurality of spaced-apart layers of magnetic material and an oppositely facing second topographically patterned imprinting surface comprising a plurality of projections and depressions arranged in a pattern corresponding to a second magnetic transition pattern to be formed in a second one of the plurality of spaced-apart layers of magnetic material, at least the first and second imprinting surfaces of the stamper/imprinter comprised of at least one magnetic material having high saturation magnetization $B_{sat} \geq$ about 0.5 Tesla, and high permeability $\mu \geq$ about 5, selected from the group consisting of Ni, NiV, NiFe, CoNiFe, CoSiFe, CoFe, and CoFeV;

(b) providing a first workpiece including a first surface comprised of the first layer of magnetic material, the first layer of magnetic material including a plurality of unidirectionally magnetically aligned magnetic domains extending to the first surface with an initial direction of alignment;

(c) providing a second workpiece including a second surface comprised of the second layer of magnetic material, the second layer of magnetic material including a plurality of unidirectionally magnetically aligned magnetic domains extending to the second surface with an initial direction of alignment;

(d) contacting the first surface of the first workpiece with the first topographically patterned imprinting surface of the dual-sided stamper/imprinter;

(e) contacting said second surface of the second workpiece with the second topographically patterned imprinting surface of the dual-sided stamper/imprinter;

(f) simultaneously selectively re-aligning the direction of alignment of the magnetic domains of those portions of the first and second layers of magnetic material in contact with the projections or facing the depressions of the first and second topographically patterned imprinting surfaces, respectively, such that the magnetic domains of the contacted portions or the facing portions are aligned in a direction reverse that of the initial direction, wherein the combination of aligned+re-aligned magnetic domains of each of the first and second layers of magnetic material form first and second magnetic transition patterns replicating the patterns of projections and depressions of the first and second topographically patterned imprinting surfaces, respectively; and (g) removing the first and second workpieces from contact with the dual-sided stamper/imprinter.

According to preferred embodiments of the present invention, step (f) comprises applying a unidirectional DC magnetic field having a direction opposite that of the initial direction of alignment of the plurality of unidirectionally magnetically aligned magnetic domains of the first and second layers of magnetic material, the DC magnetic field having sufficient strength to selectively reverse the initial alignment of the magnetic domains of the first and second layers of magnetic material contacting the projections or facing the depressions of the first and second imprinting surfaces of the dual-sided stamper/imprinter, while retaining the initial direction of alignment of the magnetic domains of the first and second layers of magnetic material facing the depressions or contacting the projections, respectively, of the first and second imprinting surfaces of the dual-sided stamper/imprinter.

Preferred embodiments of the present invention include those wherein steps (b) and (c) each comprise providing a disk-shaped workpiece for a magnetic recording medium, each including at least one layer of a magnetic recording material on at least one surface of a substrate comprised of a non-magnetic material selected from the group consisting of Al, NiP-plated Al, Al—Mg alloys, other Al-based alloys, other non-magnetic metals, other non-magnetic metal-based alloys, glass, ceramics, polymers, glass-ceramics, and composites or laminates of the aforementioned materials; and step (a) comprises providing a dual-sided stamper/imprinter having first and second topographically patterned imprinting surfaces each comprising a plurality of projections and depressions arranged in a pattern corresponding to a servo pattern to be formed in the first and second layers of magnetic material.

According to further embodiments of the present invention, at least one of steps (b) and (c) further comprises providing a plurality of spaced-apart disk-shaped workpieces arranged in a stack, each workpiece including a substrate with a layer of a magnetic recording material on both major surfaces thereof; and step (a) further comprises providing a dual-sided stamper/imprinter between each adjacent pair of workpieces of said stack.

Particular embodiments of the present invention are those wherein steps (b) and (c) each comprise providing a workpiece with a longitudinal magnetic recording layer; and step (f) comprises applying the unidirectional magnetic field in a direction parallel to said at least one surface of each of said substrates.

Further particular embodiments of the present invention are those wherein steps (b) and (c) each comprise providing a workpiece with a perpendicular magnetic recording layer; and step (f) comprises applying the unidirectional magnetic field in a direction perpendicular to the at least one surface of each of the substrates.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein:

FIGS. 6(A)–6(H) illustrate, in schematic, simplified cross-sectional view, a sequence of process steps according to the invention for manufacturing dual-sided stampers/imprinters suitable for use in contact printing of magnetic transition patterns in longitudinal and perpendicular magnetic recording media;

DESCRIPTION OF THE INVENTION

Figure 1:
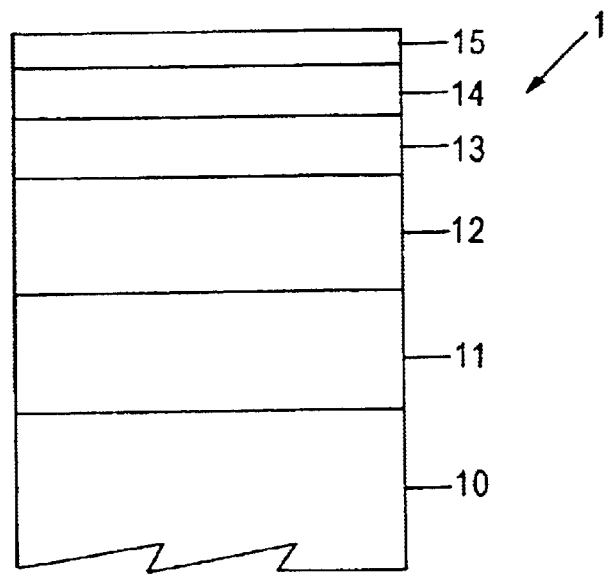
FIG. 1 illustrates, in schematic, simplified cross-sectional view, a portion of a longitudinal-type thin film magnetic recording medium.
Figure 2:
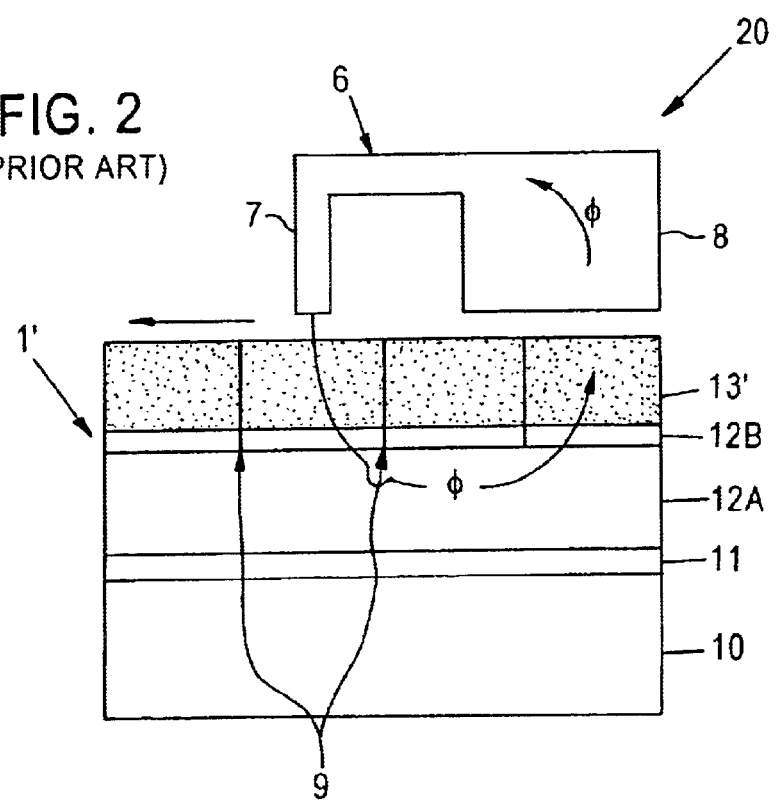
FIG. 2 illustrates, in schematic, simplified cross-sectional view, a portion of a magnetic recording, storage, and retrieval system comprised of a perpendicular-type magnetic recording medium and a single-pole transducer head.
Figure 3:
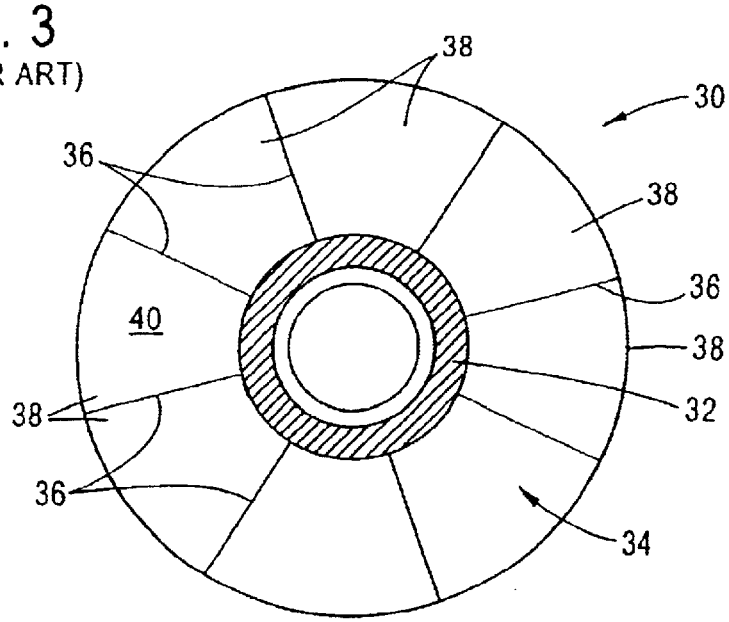
FIG. 3 is a simplified, schematic plan view, of a magnetic recording disk for illustrating the data, servo pattern, and CSS zones thereof.

The present invention addresses and solves problems attendant upon the use of single-sided stampers/imprinters with topographically patterned imprinting surfaces in performing high replication fidelity contact printing of recording layers of magnetic recording media for forming magnetic transition patterns, e.g., servo patterns, therein at high product throughput rates necessary for cost-effectiveness. Specifically, the present invention is based upon the discovery that dual-sided, topographically patterned stampers/imprinters may be fabricated and advantageously utilized in performing simultaneous contact printing of a plurality of magnetic recording media, e.g., spaced-apart in a vertical stack arrangement with a dual-sided stamper/imprinter interposed between adjacent members of the stack. Further, the dual-sided stampers/imprinters may be fabricated such that their imprinting surfaces comprise a pair of aligned, mirror image patterns for minimizing WIRRO or the patterns of the imprinting surfaces may be mutually offset.

Accordingly, the means and methodology afforded by the present invention for performing dual-sided contact printing for forming magnetic transition patterns, e.g., servo patterns, effectively avoid the above-described drawbacks and disadvantages associated with the use of conventional, single-sided stampers/imprinters, and facilitate high replication quality, high throughput replication of servo patterns via contact printing, particularly in dual-sided magnetic recording media. Moreover, the present invention affords a simple and reliable method for fabricating dual-sided stampers/imprinters which can be performed utilizing conventional manufacturing technologies.

Referring to FIGS. 6(A)–6(H) illustrated therein, in schematic, simplified cross-sectional view, is a sequence of process steps according to the invention for manufacturing dual-sided stampers/imprinters $16_{DS}$ suitable for use in contact printing of magnetic transition patterns in longitudinal and perpendicular magnetic recording media.

Adverting to FIG. 6(A), according to an initial step of the inventive dual-sided stamper/imprinter manufacturing process, a master 60 is provided, comprised of a mechanically rigid substrate 61, e.g., of a suitable mechanically robust material such as a metal, metal alloy, ceramic, glass-ceramic composite, etc., with a patterned layer of a resist material 62 formed on a major surface thereof, illustratively the upper surface $61_U$, wherein the exposed surface of the resist layer 62 includes a plurality of projections $62_P$ and depressions $62_D$ arrayed in a first topographical pattern 63 corresponding to a magnetic transition pattern to be replicated in an imprinting surface of a stamper/imprinter for contact printing of a corresponding magnetic transition pattern in a surface of a first magnetic layer, e.g., a servo pattern in a recording layer of a magnetic disk. Typical topographical patterns 63 for use in forming such servo patterns in disk-shaped magnetic recording media comprise projections $62_P$ having a height in the range from about 20 to about 500 nm, a width in the range from about 0.01 to about 1 μm, and a spacing (defining depressions $62_D$) of at least about 0.01 μm. Master 60 may, for example, be fabricated by first forming resist layer 62 on the surface of substrate 61, as by conventional spin coating, followed by patterning of the resist layer 62 by means of conventional photolithographic processing or selective e-beam exposure of the resist material, followed by solvent or chemical development to effect pattern formation therein.

Referring to FIG. 6(B), the topographically patterned resist layer 62 comprised of projections $62_P$ and depressions 62 is then coated with a thin strike layer 64, i.e., from about 20 to about 500 nm thick, preferably about 110 nm thick, of an electrically conductive magnetic material having a high saturation magnetization $B_{sat} \geq$ about 0.5 Tesla, and high permeability $\mu \geq$ about 5, by any suitable thin film deposition technique including, but not limited to: electroless plating, physical vapor deposition (PVD), and chemical vapor deposition (CVD). By way of illustration, thin strike layer 64 may be deposited by sputtering an about 110 nm thick layer of Ni, NiV, NiFe, CoNiFe, CoSiFe, CoFe, or CoFeV.

According to the next step of the inventive methodology, shown in FIG. 6(C), a relatively thick blanket layer 65 of a magnetic material having a high saturation magnetization $B_{sat} \geq$ about 0.5 Tesla, and high permeability $\mu \geq$ about 5, is formed over thin strike layer 64 by any suitable deposition technique, so as to overfill each of the recesses or depressions $62_D$ and to include overburden portions extending over each of the projections $62_P$ of the first topographical pattern 63. Blanket layer 65 may, for example, be formed by an electrochemical technique, such as electroforming, and comprised of Ni, NiV, NiFe, CoNiFe, CoSiFe, CoFe, or CoFeV. The exposed upper surface $65_U$ of blanket layer 65 may, if necessary, receive suitable post-formation processing, e.g., chemical-mechanical polishing (CMP), for effecting planarization thereof.

Referring to FIG. 6(D), resist layer 66 is then formed on the exposed upper surface $65_U$ of blanket layer 65 of the thus-formed structure, as by a conventional technique such as spin coating, followed by patterning (see FIG. 6(E)), e.g., by conventional photolithographic or e-beam methodology, to selectively expose portions of the upper surface $65_U$ of blanket layer 65 for forming a patterned resist layer 67 defining a second topographical pattern 68 corresponding to a second magnetic transition pattern to be replicated in a second imprinting surface of the stamper/imprinter for contact printing of a corresponding magnetic transition pattern in a surface of a second magnetic layer, e.g., a servo pattern in a recording layer of a magnetic disk. The widths, spacings, and lateral locations of the masked and exposed portions of patterned layer 67 are selected according to whether the second topographical pattern 68 is to be a mirror image of the first topographical pattern 63, laterally offset from the first topographical pattern 63, or different from the first topographical pattern 63.

Adverting to FIG. 6(F), in the next step according to the invention, the exposed upper surface $65_U$ of the blanket magnetic layer 65 is then selectively patterned, e.g. by wet chemical etching, utilizing patterned resist layer 67 as an etching mask, to form a patterned plurality of projections $65_P$ and depressions $65_D$ therein corresponding to the second topographical pattern 68, followed by removal of the patterned mask layer 67, for example by plasma ashing or similar resist removal process, as shown in FIG. 6(G). As before, typical topographical patterns 68 for use in forming such servo patterns in disk-shaped magnetic recording media comprise projections $65_P$ having a height in the range from about 20 to about 500 nm, a width in the range from about 0.01 to about 1 $\mu$m, and a spacing (defining the depressions $65_D$) of at least about 0.01 $\mu$m.

Referring to FIG. 6(H), in the final step of the inventive methodology, dual-sided stamper/imprinter $16_{DS}$, illustratively, but not limitatively, of mirror image design (wherein the projections $62_P$ and depressions $62_D$ of the first topographical pattern 63 have respective mirror image counterparts $65_P$ and $65_D$ in the second topographical pattern 68), is then separated from master 60, as by a stripping process, and may be utilized, as described below, for performing simultaneous contact printing of magnetic transition patterns in a pair of (vertically) spaced-apart magnetic layers. Master 60 may be re-used for forming additional dual-sided stampers/imprinters $16_{DS}$, provided the first topographical pattern 63 of projections $62_P$ and depressions $62_D$ in resist layer 62 is unaffected by the previous separation/stripping of dual-sided stamper/imprinter $16_{DS}$ therefrom.

Figure 7:
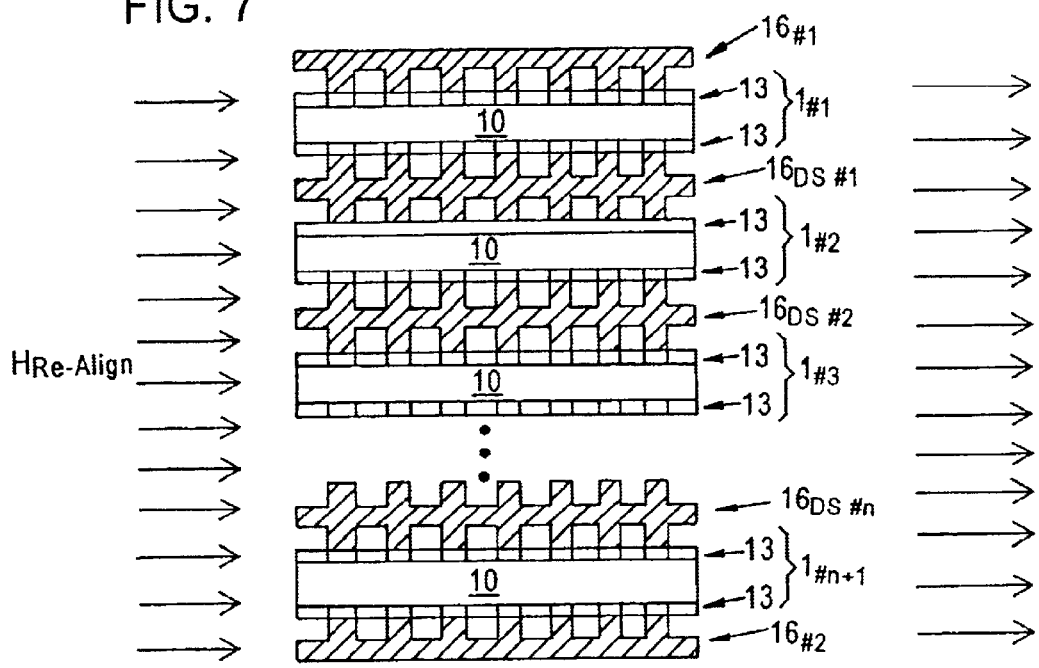
FIG. 7 illustrates, in schematic, simplified cross-sectional view, a process and arrangement for contact printing magnetic transition patterns in a stacked plurality of longitudinal magnetic recording media utilizing a plurality of stacked dual-sided stampers/imprinters, according to the present invention.
Figure 8:
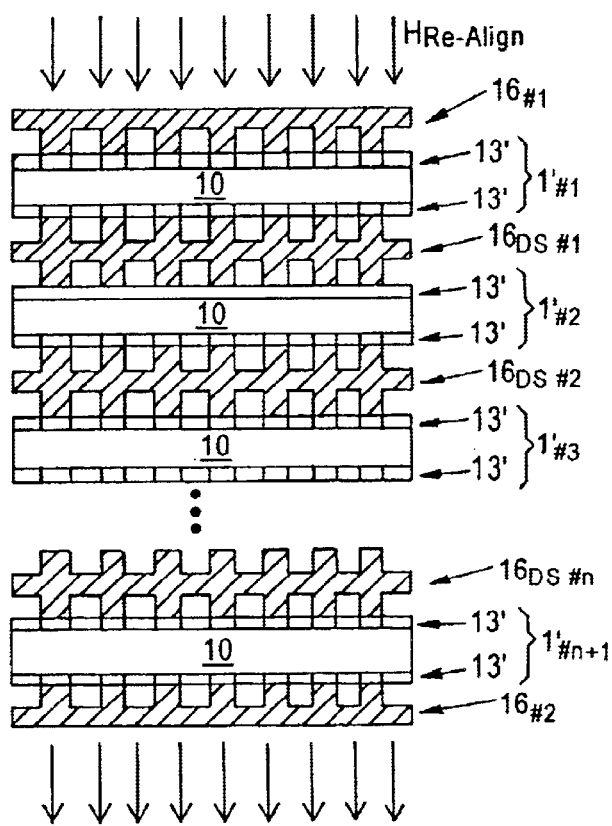
FIG. 8 illustrates, in schematic, simplified cross-sectional view, a process and arrangement for contact printing magnetic transition patterns in a stacked plurality of perpendicular magnetic recording media utilizing a plurality of stacked dual-sided stampers/imprinters, according to the present invention.

With reference to FIGS. 7 and 8, illustrated therein, in schematic, simplified cross-sectional view, are processes and arrangements for contact printing magnetic transition patterns in stacked pluralities of dual-sided longitudinal and perpendicular magnetic recording media 1 and 1', respectively, utilizing pluralities of stacked dual-sided stampers/imprinters $16_{DS}$ according to the present invention.

In either instance, a stacked plurality of magnetically initialized (i.e., unidirectionally aligned), dual-sided magnetic recording media, for example, longitudinal magnetic recording media $1_{\#1}$ through $1_{\#n+1}$ (each comprised of a non-magnetic substrate 10 with a longitudinal magnetic recording layer 13 on each of the oppositely facing major surfaces thereof) or perpendicular magnetic recording media $1'_{\#1}$ through $1'_{\#n+1}$ (each comprised of a non-magnetic substrate 10 with a perpendicular magnetic recording layer 13' on each of the oppositely facing major surfaces thereof), is assembled with a plurality of dual-sided stampers/imprinters $16_{DS \#1}$ through $16_{DS \#n}$ inserted between and in contact with the magnetic recording layers of each adjacent pair of the dual-sided longitudinal or magnetic recording media. First and second single-sided stampers/imprinters $16_{\#1}$ and $16_{\#2}$ are provided at the upper and lower ends of each of the stacks for imprinting the upper magnetic recording layer of the uppermost recording medium $1_{\#1}$ or $1'_{\#1}$ and the lower magnetic recording layer of the lowermost recording medium $1_{\#n+1}$ or $1'_{\#n+1}$.

Figure 5:
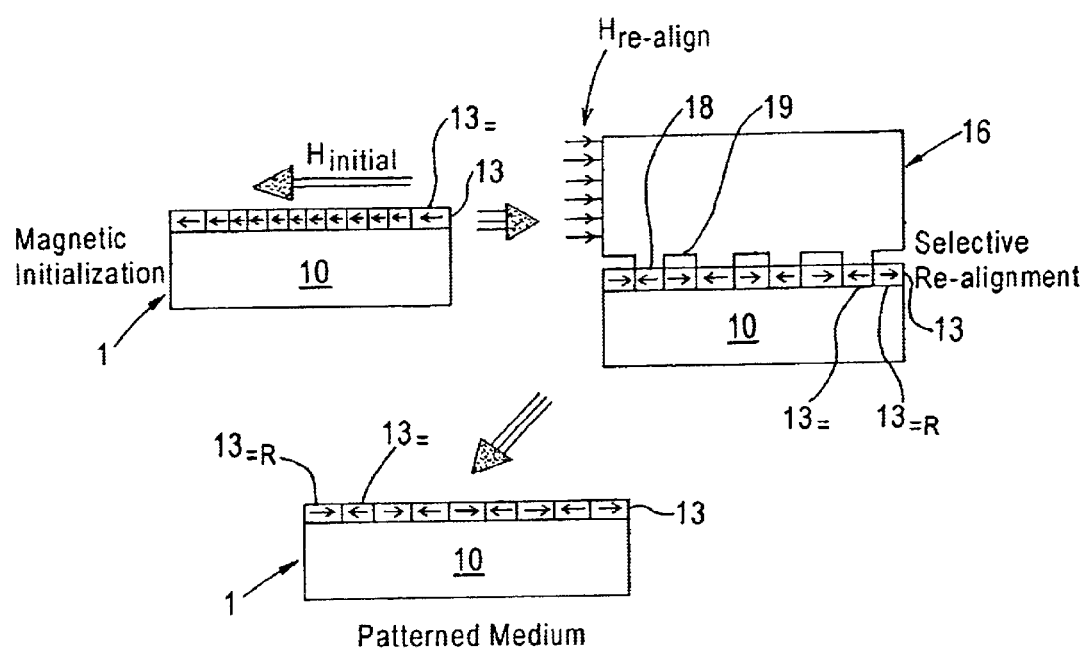
FIG. 5 illustrates, in schematic, simplified cross-sectional view, a similar sequence of process steps for contact printing a magnetic transition pattern in the surface of a longitudinal magnetic recording layer.

Referring more specifically to FIG. 7, upon assembly of the stack of longitudinal recording media, a magnetic re-alignment field $H_{re-align}$ is applied parallel to the surfaces of the magnetically initialized (pre-aligned) longitudinal magnetic recording layers 13 to simultaneously effect selective re-alignment of the magnetic domains of each medium of the stack which are not in contact with the projections of the imprinting surfaces of the stampers/imprinters, i.e., which face the depressions, as in the process illustrated in FIG. 5 and described in more detail supra.

Figure 4:
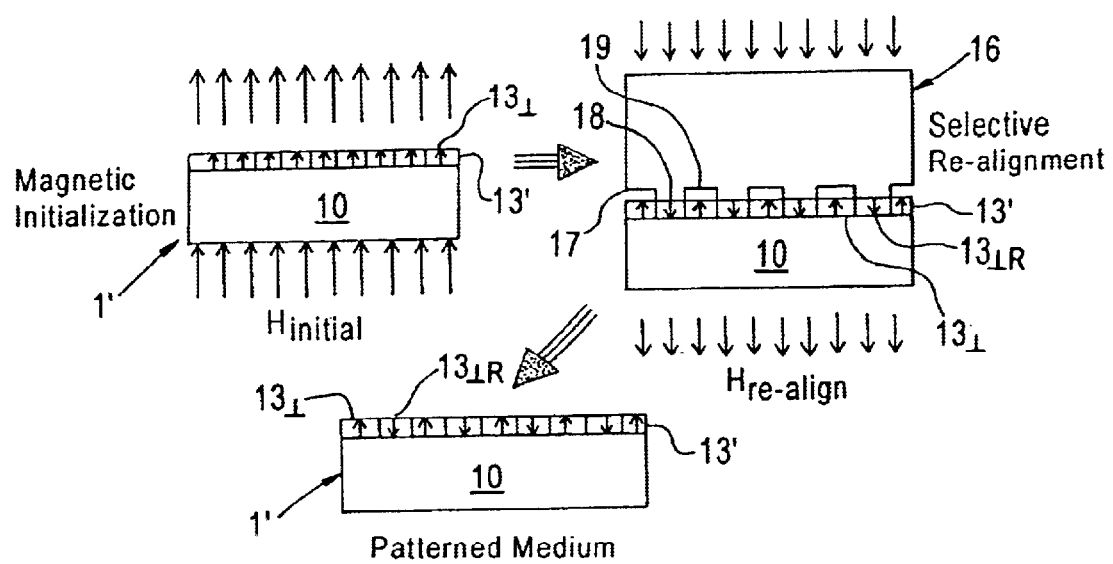
FIG. 4 illustrates, in schematic, simplified cross-sectional view, a sequence of process steps for contact printing a magnetic transition pattern in the surface of a perpendicular magnetic recording layer, utilizing a stamper/imprinter formed of a high saturation magnetization, high permeability magnetic material having an imprinting surface with a surface topography corresponding to the desired magnetic transition pattern.

Referring now to FIG. 8, upon assembly of the stack of perpendicular recording media, a magnetic re-alignment field $H_{re-align}$ is applied perpendicular to the surfaces of the magnetically initialized (pre-aligned) perpendicular magnetic recording layers 13 to simultaneously effect selective re-alignment of the magnetic domains of each medium of the stack which are in contact with the projections of the imprinting surfaces of the stampers/imprinters, as in the process illustrated in FIG. 4 and described in more detail supra.

The present invention thus affords a number of significant advantages over previous contact printing processes for forming magnetic transition patterns in magnetic recording layers, including significantly increased product throughput and increased cost-effectiveness arising from use of dual-sided stampers/imprinters together with a stacked plurality of recording media, as well as ease of formation of mirror image magnetic transition patterns in magnetic recording layers.

It should be apparent to one of ordinary skill in the art that the present invention provides a significant improvement over the conventional art such as has been described above, particularly with respect to the ease with which contact printing of magnetic transition patterns can be preformed on large numbers of magnetic recording media according to the methodology afforded by the invention. Further, the imprinting surface of the stampers/imprinters according to the invention can be formed with a wide variety of aligned or off-set magnetic transition patterns, whereby the inventive methodology and apparatus can be rapidly, easily, and cost-effectively implemented in the automated manufacture of a number of articles, devices, etc., requiring magnetic transition patterning, of which servo patterning of longitudinal and perpendicular magnetic recording media merely constitute examples of the versatility and utility of the invention.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept as expressed herein.

What is claimed is:

1. A method of manufacturing a dual-sided stamper/imprinter for use in simultaneously forming magnetic transition patterns in spaced-apart first and second layers of magnetic material by means of contact printing, comprising sequential steps of:
   (a) providing a master having a surface with a first topographical pattern formed therein and comprising a patterned plurality of spaced-apart recesses with a plurality of non-recessed areas therebetween, said first topographical pattern corresponding to a first magnetic transition pattern to be formed in said first layer of magnetic material;
   (b) forming a thin layer of an electrically conductive material on said surface with said first topographical pattern;
   (c) forming a blanket layer of a magnetic material having high saturation magnetization $B_{sat} \geq$ about 0.5 Tesla, and high permeability $\mu \geq$ about 5, on said thin layer of electrically conductive material, said blanket layer overfilling each of said plurality of recesses and including an overburden portion extending over each of said non-recessed areas, said blanket layer having an exposed surface opposite said thin layer of electrically conductive material;
   (d) forming a second topographical pattern in said exposed surface of said blanket layer, said second topographical pattern comprising a patterned plurality of spaced-apart recesses with a plurality of non-recessed areas therebetween and corresponding to a second magnetic transition pattern to be formed in said second layer of magnetic material; and
   (e) separating said blanket layer together with the underlying thin layer of electrically conductive material from said surface of said master with said first topographical pattern formed therein to provide a dual-sided stamper/imprinter having first and second oppositely facing topographically patterned imprinting surfaces.

2. The method as in claim 1, wherein:
   step (a) comprises providing a master including a substrate and a layer of a resist material formed on a surface of said substrate, said first topographical pattern corresponding to said first magnetic transition pattern being formed in said layer of resist material.

3. The method as in claim 1, wherein:
   step (b) comprises forming said thin layer of an electrically conductive material on said surface with said first topographical pattern by means of a thin film deposition process selected from the group consisting of: electroless plating, physical vapor deposition (PVD), and chemical vapor deposition (CVD).

4. The method as in claim 1, wherein:
   step (c) comprises forming said blanket layer of a magnetic material selected from the group consisting of Ni, NiV, NiFe, CoNiFe, CoSiFe, CoFe, and CoFeV.

5. The method as in claim 4, wherein:
   step (c) comprises forming said blanket layer on said thin layer of electrically conductive material by means of an electrochemical process.

6. The method as in claim 5, wherein:
   step (c) comprises forming said blanket layer by means of an electroforming process.

7. The method as in claim 1, wherein:
   step (d) comprises forming said second topographical pattern in said exposed surface of said blanket layer by means of a process comprising sequential steps of:
   ($d_1$) forming a layer of a resist material on said exposed surface of said blanket layer;
   ($d_2$) patterning said layer of resist material to expose portions of said surface of said blanket layer corresponding to said second magnetic transition pattern to be formed therein;
   ($d_3$) forming recesses in said surface of said blanket layer at said exposed portions thereof, utilizing said patterned layer of resist material as an etch mask, said recesses forming a pattern corresponding to said second magnetic transition pattern to be formed in said surface of said blanket layer; and
   ($d_4$) removing said layer of resist material from said surface of said blanket layer.

8. The method as in claim 1, wherein:
   step (a) comprises providing a master having a surface with a first topographical pattern corresponding to a servo pattern to be formed in said first magnetic layer;
   step (b) comprises sputtering a thin layer of a material selected from the group consisting of Ni, NiV, NiFe, CoNiFe, CoSiFe, CoFe, and CoFeV on said first topographical pattern;
   step (c) comprises electroforming on said thin layer a blanket layer comprised of at least one magnetic material selected from the group consisting of Ni, NiV, NiFe, CoNiFe, CoSiFe, CoFe, and CoFeV; and
   step (d) comprises forming a second topographical pattern in said exposed surface of said blanket layer corresponding to a servo pattern to be formed in said second magnetic layer.

9. A dual-sided stamper/imprinter for use in simultaneously forming magnetic transition patterns in spaced-apart first and second layers of magnetic material by means of contact printing, comprising a body of a magnetic material having high saturation magnetization $B_{sat} \geq$ about 0.5 Tesla, and high permeability $\mu \geq$ about 5, and including first and second oppositely facing imprinting surfaces, wherein:
   said first imprinting surface has a first topographical pattern formed therein comprising a patterned plurality of spaced-apart recesses with a plurality of non-recessed areas therebetween, said first topographical pattern corresponding to a first magnetic transition pattern to be formed in said first layer of magnetic material; and
   said second imprinting surface has a second topographical pattern formed therein comprising a patterned plurality of spaced-apart recesses with a plurality of non-recessed areas therebetween, said second topographical pattern corresponding to a second magnetic transition pattern to be formed in said second layer of magnetic material.

10. The dual-sided stamper/imprinter according to claim 9, wherein said first and second topographical patterns are identical.

11. The dual-sided stamper/imprinter according to claim 10, wherein said first and second topographical patterns are aligned in mirror-image relation.

12. The dual-sided stamper/imprinter according to claim 9, wherein said first and second topographical patterns are different.

13. The dual-sided stamper/imprinter according to claim 9, wherein each of said first and second topographical patterns are servo patterns for disk-shaped recording media.

14. The dual-sided stamper/imprinter according to claim 9, wherein at least said first and second imprinting surfaces are comprised of at least one magnetic material selected from the group consisting of Ni, NiV, NiFe, CoNiFe, CoSiFe, CoFe, and CoFeV.

15. A method of simultaneously forming magnetic transition patterns in a plurality of spaced-apart layers of magnetic material by means of contact printing, comprising steps of:

(a) providing a dual-sided stamper/imprinter having a first topographically patterned imprinting surface comprising a plurality of projections and depressions arranged in a pattern corresponding to a first magnetic transition pattern to be formed in a first one of said plurality of spaced-apart layers of magnetic material and an oppositely facing second topographically patterned imprinting surface comprising a plurality of projections and depressions arranged in a pattern corresponding to a second magnetic transition pattern to be formed in a second one of said plurality of spaced-apart layers of magnetic material, at least said first and second imprinting surfaces of said stamper/imprinter comprised of at least one magnetic material having high saturation magnetization $B_{sat} \geq$ about 0.5 Tesla, and high permeability $\mu \geq$ about 5, selected from the group consisting of Ni, NiV, NiFe, CoNiFe, CoSiFe, CoFe, and CoFeV;

(b) providing a first workpiece including a first surface comprised of said first layer of magnetic material, said first layer of magnetic material including a plurality of unidirectionally magnetically aligned magnetic domains extending to said first surface with an initial direction of alignment;

(c) providing a second workpiece including a second surface comprised of said second layer of magnetic material, said second layer of magnetic material including a plurality of unidirectionally magnetically aligned magnetic domains extending to said second surface with an initial direction of alignment;

(d) contacting said first surface of said first workpiece with said first topographically patterned imprinting surface of said dual-sided stamper/imprinter;

(e) contacting said second surface of said second workpiece with said second topographically patterned imprinting surface of said dual-sided stamper/imprinter;

(f) simultaneously selectively re-aligning the direction of alignment of the magnetic domains of those portions of said first and second layers of magnetic material in contact with said projections or facing said depressions of said first and second topographically patterned imprinting surfaces, respectively, such that said magnetic domains of said contacted portions or said facing portions are aligned in a direction reverse that of said initial direction, wherein the combination of aligned+ re-aligned magnetic domains of each of said first and second layers of magnetic material form first and second magnetic transition patterns replicating the patterns of projections and depressions of said first and second topographically patterned imprinting surfaces, respectively; and (g) removing said first and second workpieces from contact with said dual-sided stamper/imprinter.

16. The method as in claim 15, wherein:

step (f) comprises applying a unidirectional DC magnetic field having a direction opposite that of said initial direction of alignment of said plurality of unidirectionally magnetically aligned magnetic domains of said first and second layers of magnetic material, said DC magnetic field having sufficient strength to selectively reverse the initial alignment of said magnetic domains of said first and second layers of magnetic material contacting said projections or facing said depressions of said first and second imprinting surfaces of said dual-sided stamper/imprinter, while retaining the initial direction of alignment of said magnetic domains of said first and second layers of magnetic material facing said depressions or contacting said projections, respectively, of said first and second imprinting surfaces of said dual-sided stamper/imprinter.

17. The method as in claim 16, wherein:

steps (b) and (c) each comprise providing a disk-shaped workpiece for a magnetic recording medium, each including at least one layer of a magnetic recording material on at least one surface of a substrate comprised of a non-magnetic material selected from the group consisting of Al, NiP-plated Al, Al-Mg alloys, other Al-based alloys, other non-magnetic metals, other non-magnetic metal-based alloys, glass, ceramics, polymers, glass-ceramics, and composites or laminates of the aforementioned materials; and step (a) comprises providing a dual-sided stamper/ imprinter having first and second topographically patterned imprinting surfaces each comprising a plurality of projections and depressions arranged in a pattern corresponding to a servo pattern to be formed in said first and second layers of magnetic material.

18. The method as in claim 17, wherein:

at least one of steps (b) and (c) further comprises providing a plurality of spaced-apart disk-shaped workpieces arranged in a stack, each workpiece including a substrate with a layer of a magnetic recording material on both major surfaces thereof; and step (a) further comprises providing a dual-sided stamper/ imprinter between each adjacent pair of workpieces of said stack.

19. The method as in claim 17, wherein:

steps (b) and (c) each comprise providing a workpiece with a longitudinal magnetic recording layer; and step (f) comprises applying said unidirectional magnetic field in a direction parallel to said at least one surface of each of said substrates.

20. The method as in claim 17, wherein:

steps (b) and (c) each comprise providing a workpiece with a perpendicular magnetic recording layer; and step (f) comprises applying said unidirectional magnetic field in a direction perpendicular to said at least one surface of each of said substrates.

* * * * *